W. MORRISON.

SECONDARY BATTERY PLATE.

APPLICATION FILED DEC. 8, 1909.

Reissued Feb. 15, 1910. 13,083.

Witnesses

Jos. F. Collins

Elvis S. Clarkson

By

Inventor

William Morrison

Jno. S. Bruce

Attorney

UNITED STATES PATENT OFFICE.

WILLIAM MORRISON, OF DES MOINES, IOWA, ASSIGNOR TO THE WESTINGHOUSE STORAGE BATTERY COMPANY, A CORPORATION OF NEW YORK.

SECONDARY-BATTERY PLATE.

13,083. Specification of Reissued Letters Patent. Reissued Feb. 15, 1910.

Original No. 916,576, dated March 30, 1909, Serial No. 163,463. Application for reissue filed December 8, 1909. Serial No. 531,961.

*To all whom it may concern:*

Be it known that I, WILLIAM MORRISON, a citizen of the United States of America, and resident of Des Moines, Polk county, Iowa, have invented a certain new and useful Improvement in Secondary-Battery Plates, of which the following is a specification.

My invention contemplates the use of a salt of barium for the purpose of preventing disintegration of the active material of a storage battery plate while immersed in an electrolyte consisting of a solution of sulfuric acid.

Figure 1:
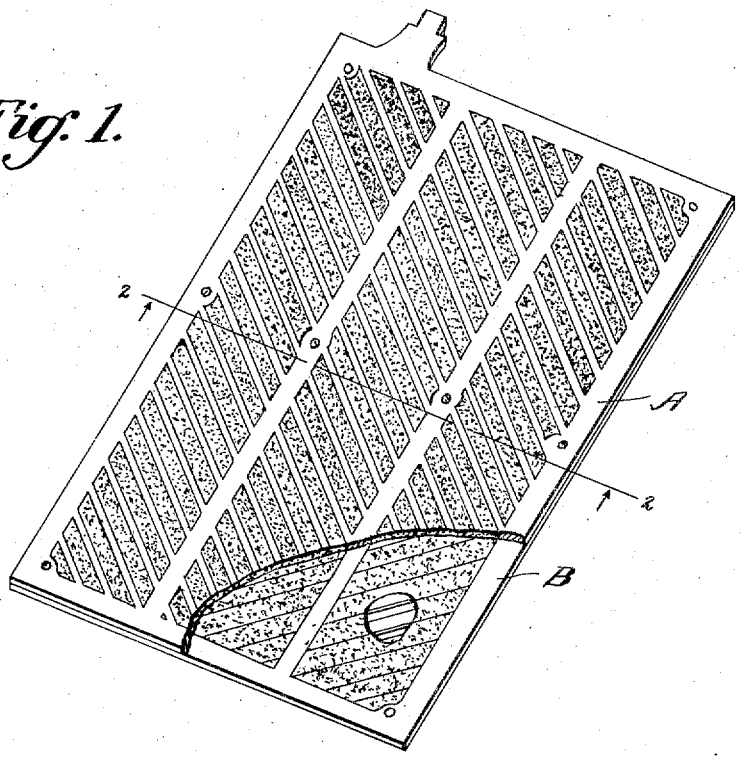
Figure 2:
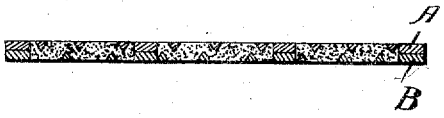

In the accompanying drawings: Figure 1 is a perspective of a form of storage battery plate in which my invention may be employed. Fig. 2 is a cross-section of said plate.

In practicing my invention, I first take a suitable quantity of red lead or litharge and place the same on a suitable surface, as, for example, the surface of a piece of glass. To this red lead or litharge I then add a saturated solution of hydroxid of barium, in the proportion of one fluid ounce of solution to one and a quarter pounds of lead, so as to fairly moisten the lead or litharge and reduce the same to a slight pasty condition. After this, I then add a solution of sulfuric acid, water and ammonium sulfate, in the proportion of ten gallons of sulfuric acid at 1.175 specific gravity to eight pounds of ammonium sulfate, the latter being added to the former, and in such quantity as to reduce the mass or mixture to a paste suitable for pressing into the openings of the plate or grid.

When the mixture of the foregoing ingredients has been sufficiently kneaded and worked into a thoroughly pasty condition, I then take the lead plate or grid and fill its openings or cavities with the paste, pressing the paste in with the pressure of a trowel or putty knife, and then carefully smoothing off the surface of the plate. After this, I find that the best results are obtained by withdrawing as much water from the paste in the plate as possible by pressing the opposite surfaces of the plate alternately upon an absorbent paper, and by repeating this operation until the paste in the plate is relieved of considerable of the water and moisture. In some cases it is advisable to apply pressure with a press or other means, particularly where longer life and slower rate of delivery of the current are required. When this has been done, it is well to then allow the plate to stand for a suitable length of time, say for about five days. At the end of this time, the plate can be dipped in a solution of weak sulfuric acid and water, and this dipping repeated once or more, according to judgment, will be found to exert a further hardening effect upon the paste.

A plate constructed by the foregoing process has a paste or active material which remains hard and firm in use, for a much longer time than is usual with the old or former methods, which is tough and not liable to crack or break, and which does not disintegrate as quickly as the substances heretofore employed when immersed and used in the usual electrolyte containing sulfuric acid. The salt acts as a bond, and does not weaken or disintegrate under the influence of sulfuric or sulfurous acid as soon as the substances heretofore employed.

The grid can be constructed in any suitable manner. For example, it may consist of a couple of lead plates A and B, suitably secured together, and so constructed as to provide openings into which the paste can be pressed or packed, and of such formation that the paste when hardened will be held firmly in place. It is obvious, however, that any other suitable known or approved form of grid can be employed in combination with my improved paste.

Broadly considered, my invention consists in using the salts of a metal of the alkaline earths, preferably barium, the sulfates of which are insoluble, or practically insoluble, in water or dilute sulfuric acid.

What I claim as my invention is:

1. A storage battery plate having an active material comprising oxid of lead, sulfuric acid, water, ammonium sulfate, and barium sulfate.

2. Active material or material adapted to become active for storage battery plates, consisting of lead or lead oxid containing insoluble inert nonsetting sulfate.

3. Active material or material adapted to become active for storage battery plates, consisting of lead or oxid of lead containing sulfate of barium.

4. Active material or material adapted to become active for storage battery plates, consisting of lead or oxid of lead containing precipitated sulfate of barium.

5. Active material or material adapted to become active for storage battery plates, consisting of lead or oxid of lead containing barium sulfate precipitated from a solution of barium hydroxid.

6. Active material or material adapted to become active for storage battery plates, consisting of lead or oxid of lead containing barium sulfate precipitated from a solution of a soluble barium salt.

Signed by me at Chicago, Illinois, this 1st day of December, A. D. 1909.

WILLIAM MORRISON.

Witnesses:
JNO. S. GREEN,
F. H. DRURY.